Sept. 10, 1968   J. B. WALKER ET AL   3,401,026
METHOD OF FORMING A BIMETALLIC ARTICLE
Filed Jan. 19, 1966   3 Sheets-Sheet 1

INVENTORS
James B. Walker &
Raymond S. Amala
Peter P. Kozak
ATTORNEY

INVENTORS
James B. Walker &
Raymond S. Amala
Peter P. Kozak
ATTORNEY

United States Patent Office 3,401,026
Patented Sept. 10, 1968

3,401,026
METHOD OF FORMING A BIMETALLIC ARTICLE
James B. Walker, Almont, and Raymond S. Amala, Oak Park, Mich., assignors to General Motors Corporation, Detroit, Mich., a corporation of Delaware
Continuation-in-part of application Ser. No. 450,043, Apr. 22, 1965. This application Jan. 19, 1966, Ser. No. 521,586
14 Claims. (Cl. 29—196.2)

ABSTRACT OF THE DISCLOSURE

A bimetallic article having a higher melting metal portion and a lower melting metal portion with a strong metallurgical and interlocking mechanical bond therebetween is formed by providing the higher melting portion with an irregular surface at the intended interfacial area, which surface is characterized by a multiplicity of cavities, interstices and recesses; contacting this irregular surface with the lower melting metal in the molten state; subjecting the molten metal in the region of the irregular surface to high frequency sonic vibrations so that the molten metal quickly and thoroughly wets the irregular surface to form a layer of lower melting metal over all of the interfacial area bonded thereto by an integral metallurgical bond; and immediately inserting said higher melting portion into a mold and casting molten lower melting metal into the mold against the wetted surface of the higher melting portion.

---

This invention relates to a method of forming bimetallic articles, as for example brake drums having a ferrous metal liner and an aluminum body, and the like. In particular it relates to a method of making the bimetallic article whereby a mechanical and metallurgical bond is formed at the bimetallic interface.

This application is a continuation-in-part of our copending application Ser. No. 450,043, filed Apr. 22, 1965 entitled, "Method and Apparatus for Metal Wetting Liners."

Many useful articles of commerce are bimetallic in nature. That is to say, they are composed of two dissimilar metals which are bonded together at a common surface for a specific purpose. Typically one of the metals offers desirable properties in a given application while the other metal or alloy is advantageous in a different respect. It is not an unusual industrial application which requires the combination of the diverse properties of dissimilar metals in the same article. An example of such a bimetallic article is the ferrous metal-aluminum brake drum found in automobiles and other vehicles.

In the case of the brake drum it is necessary to have a surface which has good braking properties. In general, these properties include wear resistance and the tendency not to fade. At the same time it is desirable to have good heat conductance properties whereby the frictional heat is dissipated from the braking surface. It is known that by combining aluminum bodies with ferrous metal liners inherent advantages of both metals or alloys may be combined. However, it has proven to be rather a difficult problem to obtain a satisfactory bond between the aluminum and iron portions of the drum. By introducing an irregular surface characterized by a multiplicity of cavities, craters and recesses on the periphery of the ferrous metal brake liner, and subsequently forcing molten aluminum into these cavities an interlocking mechanical bond may be obtained. For some applications this bond is entirely satisfactory. However, for frequent stops from high speeds under heavy loads it is desirable to have, in addition, a metallurgical bond between the iron and aluminum which permits better heat transfer and greater strength at higher temperatures. It has been particularly difficult to obtain a metallurgical bond between the ferrous metal brake liner and the aluminum body in conjunction with the cratered surface on the brake liner.

It is an object of this invention to provide a bimetallic article comprised of two dissimilar metallic portions, one higher melting and one lower melting, which portions have an interfacial area common to each wherein they are interlockingly mechanically and metallurgically bonded together.

It is a further object of this invention to provide a bimetallic brake drum formed with an aluminum or aluminum alloy body and a steel or cast iron liner braking surface. In this bimetallic brake drum the aluminum and ferrous portions are both metallurgically and interlockingly mechanically bonded together.

It is a still further object of this invention to provide a method of forming bimetallic articles in which the two metallic portions are bonded together at a common interfacial area metallurgically as well as interlockingly mechanically.

It is a more specific object of this invention to provide a method of forming a bimetallic brake drum in which an aluminum or aluminum alloy body portion and a ferrous metal liner portion are joined together with a metallurgical as well as an interlockingly mechanical bond.

In general, these and other objects are accomplished in accordance with our invention by first forming the higher-melting portion of the bimetallic article with a nonsmooth irregular surface in the interfacial area, which surface ultimately is to be bonded to the lower-melting portion. This irregular surface is characterized by a multiplicity of discrete cavities or recesses. Next, this irregular interfacial surface is contacted with a lower-melting metal in the molten state. However, merely contacting this irregular surface with molten metal is normally insufficient to wet the cavities, pits, or craters. To assist in the wetting we create an intensive cavitation field in the molten metal in an area closely associated with the irregular surface of the solid higher-melting portion. High frequency sonic vibrations are used to create this cavitation field. Under the influence of this field the molten metal thoroughly wets the irregular surface including the cavities therein to form a layer of molten metal over all of the interfacial area. The molten metal layer is bonded to the surface by an integral higher melting metallic-lower melting metallic interlayer. As soon as the molten metal has wetted the interfacial area the metallic portion is inserted into a mold and molten lower-melting metal is cast against the wetted surface. Upon solidification a bimetallic article is obtained in which the lower-melting portion is joined to the higher-melting portion by both a metallurgical and interlockingly mechanical bond.

In a preferred embodiment of our process the molten metal is contacted with the irregular surface of the higher-melting portion by immersing the solid higher-melting portion in a bath of the molten metal. The cavitation field is created by coupling a radiator surface to a flexural member and immersing this radiator surface in the molten bath closely adjacent to the irregular surface. The flexural member is then subjected to high frequency sonic vibrations which upon being radiated into the bath create the desired cavitational field. After the higher-melting portion has been so wetted the casting of the lower-melting portion against it may be accomplished by static or gravity casting.

A more complete understanding of the subject invention can be derived from the following detailed description taken in conjunction with the drawings in which.

As is indicated above, an important aspect of the subject casting process is the step in which a solid higher-melting section of a bimetallic article is thoroughly and uniformly wetted with a lower-melting metal in the molten state, thereby ultimately effecting a vastly improved bimetallic bond in the final cast article. In a preferred embodiment a brake drum consisting of a cast iron liner and an aluminum alloy body is prepared by our process. The cast iron liner, which peripheral surface is characterized by a plurality of cavities and craters, is wetted in a bath of molten aluminum alloy.

It is believed that a description of the wetting step of our process will be more meaningful when it is cited concurrently with a description of an apparatus which we have invented to perform said wetting operation.

Figure 1:
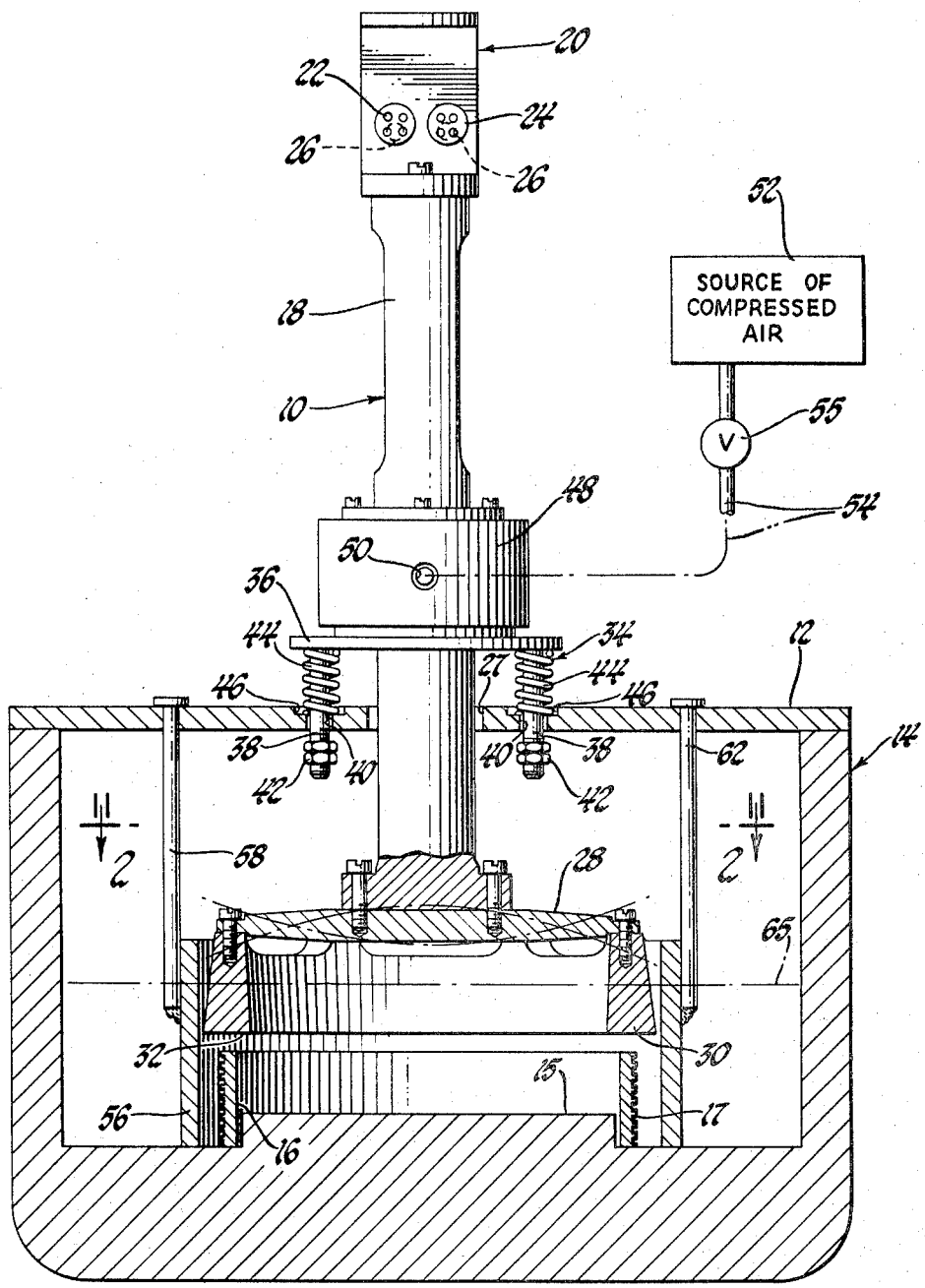
FIGURE 1 is an elevation view illustrating a vibratory apparatus suitable for use in our process.
Figure 2:
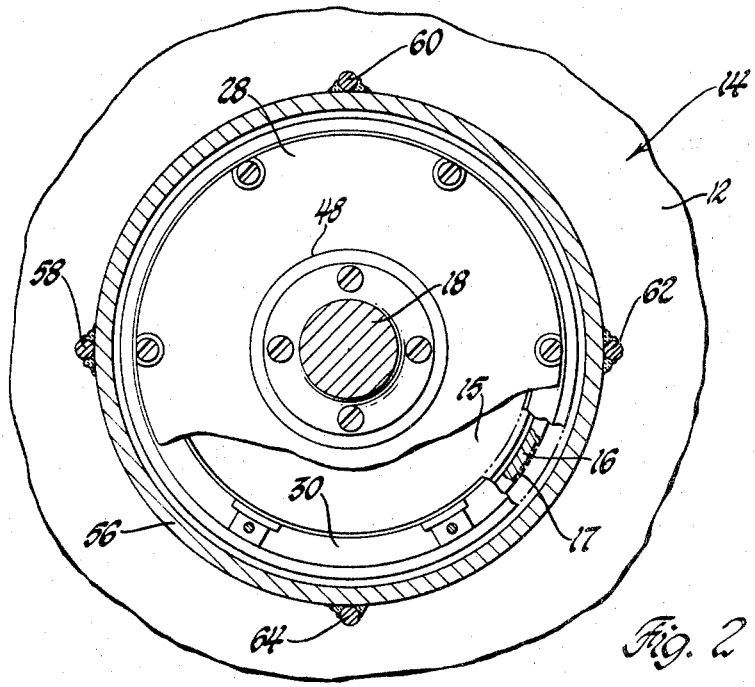
FIGURE 2 is a view taken on line 2—2 of FIGURE 1.

Referring now to the drawings and more specifically FIGURES 1 and 2 thereof, a vibratory apparatus 10 is shown supported by a plate 12 which in turn rests on the upper end of a container 14. The container 14 is filled to a predetermined level with a molten aluminum and has the floor portion thereof formed with a boss 15 so as to suitably support and locate a ring-shaped brake liner 16 in a predetermined position preparatory to the wetting thereof. The container is made from a refractory material, such as high alumina or silicon carbide, so it can withstand the high temperatures of the molten aluminum.

The vibratory apparatus 10 comprises an elongated cylindrical force transmitting bar 18, which at its upper end is connected with a vibration generating means 20 that includes a pair of air-driven vibrators 22 and 24. The vibration generating means 20 is of a type shown in detail in FIGURES 1 and 4 of copending United States patent application Ser. No. 355,569, entitled "Sonic Method and Apparatus for Wetting Metals," filed Mar. 30, 1964, and assigned to the assignee of this invention. Reference is made to the aforesaid patent application for a complete understanding of the type of vibration generating means utilized with this invention; however, for present purposes, it will suffice to say that the vibrators 22 and 24 each have a cylindrical working chamber in which a cylindrical roller 26 is freely located and adapted to orbit thereabout. A plurality of jets are tangentially located about the working chamber and are adapted to direct high velocity streams of compressed air that impinge against the peripheral surface of the roller so as to drive the latter about the working chamber and thereby produce a rotating force vector which acts against the support housing of the vibrator. Suitable passage means are provided in the bar to direct air to the jets for driving the rollers of the respective vibrators in opposite directions and thereby cause all forces other than those acting along the longitudinal axis of the bar 18 to be canceled. Thus, in effect, the vibration generating means 20 incorporated with this invention produces a reciprocating force that acts along the longitudinal axis of the bar 18.

The lower end of the bar 18 extends through an opening 27 in the plate 12 and is centrally connected to a disk-shaped member 28 which is bolted adjacent the edge thereof to the upper end of an annular coupling member 30 that terminates at its lower end with a planar radiator surface 32. The member 30 is made of cast iron; however, in cases where increased durability is desired, it can be made of a ceramic material. The bar 18 is supported on the plate 12 through an isolator assembly 34 that includes a mounting plate 36. A plurality of circumferentially and equally spaced studs 38 extend downwardly from the mounting plate 36 and have the threaded ends thereof accommodated by appropriate openings 40 formed in the support plate 12 and connected to the latter by nuts 42. A coil spring 44 encircles each stud and has the upper end contacting the mounting plate 36 while the lower end is seated in a well 46 found in the surface of the support plate 12. As should be apparent, the springs 44 serve to isolate the vibratory apparatus 10 from the supporting structure and thereby preclude any loss of vibratory energy thereto during the operation of the apparatus.

Immediately above the mounting plate 36 an air manifold collar 48 is locked to the bar 18 and includes an air inlet port 50 which receives compressed air from a suitable source indicated by the numeral 52 via an air conduit 54. An air control valve 55 is interposed in the conduit 54 and serves to regulate the air flow to the vibration generating means 20. In this particular form of the apparatus, a cylindrical baffle 56 is attached to the support plate 12 by four equally spaced rods 58, 60, 62 and 64 as best seen in FIGURE 2. The rods are rigidly connected at their lower ends to the baffle 56 and slidably supported at their upper ends by the support plate 12. As will be more fully understood as the description of the invention proceeds, the baffle can take other forms, the purpose thereof primarily being to act as a means for confining and reflecting vibratory energy emanating from the radiator surface.

In practicing the invention, the container 14 is first filled with molten aluminum to a level which assures that the upper end of the liner is submerged below the upper surface 65 of the bath but still allows sufficient room for partial submersion of the coupling member 30 as seen in FIGURE 1. As aforementioned, suitable means (not shown) are utilized for maintaining the aluminum in a molten state and such means can be a channel type induction furnace, an open hearth furnace, or a gas-fired crucible furnace. The aluminum provided in the container 14 can either be a pure aluminum or an aluminum alloy.

While maintaining the aluminum in a molten state, the brake liner 16 is immersed into the bath of aluminum and located, as shown, with its inner diameter surrounding the guide boss 15. In a preferred embodiment of our process the peripheral surface 17 of the liner 16 is characterized by a multiplicity of cavities and recesses 17 which ultimately are instrumental in the formation of a mechanical bond, as well as a metallurgical bond, with the aluminum body portion in a subsequent phase of our process. This direct immersion procedure is normally followed when the liner is made from steel; however, when made from cast iron, the peripheral surface of the liner should be cleaned preparatory to immersion so as to assure a good metallurgical bond between the dissimilar metals. There are various methods of cleaning the peripheral surface of the cast iron liner and some cleaning treatments which have been found acceptable include sandblasting, an electrolytic salt bath treatment, or mechanically cutting a thin layer of metal from the outer surface of the liner. When the peripheral surface of the ring has been provided with a plurality of cavities and recesses a mild sandblasting is preferred if surface cleaning is required. Once the outer surface of the cast iron liner is cleaned, it is then dipped into the bath of aluminum and located in a manner as described above.

The vibratory apparatus 10 is then energized by opening the valve 55 so as to direct compressed air from the source 52 to the vibration generating means 20. Sufficient air is supplied to the vibrators 22 and 24 to enable the latter to direct force impulses through the bar 18 to the member 28 at a frequency which is in the range of the resonant frequency of the member 28 so that the latter vibrates in a standing wave form as illustrated in FIG. 1. During standing wave vibration the points of minimized vibration amplitude are termed nodes, and the points of maximized vibration amplitude are termed antinodes. When the member 28 is subjected to this form of vibration, it does not vibrate bodily or as a whole but elastically in a flexural wave form. As seen in FIGURE 1, during resonant standing wave vibration the center and the outer edges of the member 28 are located at antinode points with a nodal circle existing therebetween and passing through points N and N'. Thus, the coupling member 30 is located on an antinodal circle and therefore experiences increased deflection as a result of resonant operation.

It will be understood that during production operation the vibratory apparatus 10 and the container 14 can be incorporated into a press type machine. In other words, the container would be supported by the stationary or lower platen while the vibratory apparatus would be suitably mounted to the movable or upper platen coaxial with the boss 15. Thus, once the vibratory apparatus 10 is brought up to its operating frequency and the press is closed, the radiator surface 32 is immersed into the molten aluminum to a point slightly above the liner 16. It will be noted that the baffle 56 will then contact the floor of the container and be located concentric with and adjacent to the outer surface of the liner. Thus, a certain amount of the molten aluminum will be confined within the enclosure created by the baffle 56 and the vibratory energy emanating from the radiator surface 32 can now be concentrated in the area between the baffle and the peripheral surface of the liner. This permits the baffle to act as a reflector of the sonic waves generated by the radiator surface 32 and serves to confine the vibratory energy to an area adjacent to the periphery of the liner and thereby produce increased cavitation which results in a wetting of the brake liner.

In one test run of the method and vibratory apparatus described above, extremely good wetting was obtained on the peripheral surface of a cast iron brake liner which was approximately three inches in height, had an inner diameter of twelve inches and an outer diameter of twelve and one-half inches. An aluminum alloy was utilized for accomplishing the wetting and was composed of 9.5% silicon, 0.5% magnesium and a balance of pure aluminum. The bath of aluminum was maintained at a temperature between 1400° and 1450° F. Prior to wetting, the liner was cleaned by mechanically cutting a thin layer of metal from the entire outer surface of the liner. The vibratory apparatus utilized in this particular test consisted of a bar 18 having a length of 42.75 inches and a major diameter of 3.0 inches. The bar was connected to a disk-shaped member 28 which had a diameter of 14 inches, a center thickness of 1.16 inches, and tapered down to an edge thickness of 0.50 inch. The vibrators 22 and 24 were of a type that were capable of generating 1,000 pounds of force at 1,000 cycles per second. The coupling member 30 had an over-all height of 3 inches, an outer diameter of 14.75 inches with an inner diameter of 11.25 inches.

During the wetting process in the above-mentioned test run the radiator surface 32 of the coupling member was located approximately 0.25 inch from the upper edge of the liner. It was found that so long as this distance was in a range between 0.25 and 0.75 inch, good wetting was obtained. The inner wall of the baffle 56 was located a distance between 0.50 and 1.0 inches from the peripheral surface of the brake liner. During this particular test run, the disk-shaped member achieved resonant standing wave movement at approximately 800 cycles per second and had a peak-to-peak amplitude of approximately 0.009 inch at the antinode points. Acceleration levels of the radiator surface 32 were measured in air and found to be in the area of 300 g's and complete wetting of the peripheral surface of the brake liner was obtained in several seconds. As should be apparent, after the brake liner was wetted, as explained above, the vibratory apparatus was raised out of the aluminum bath followed by removal of the brake liner for further processing. A new brake liner can then be placed in the aluminum bath and the process repeated.

Figure 3:
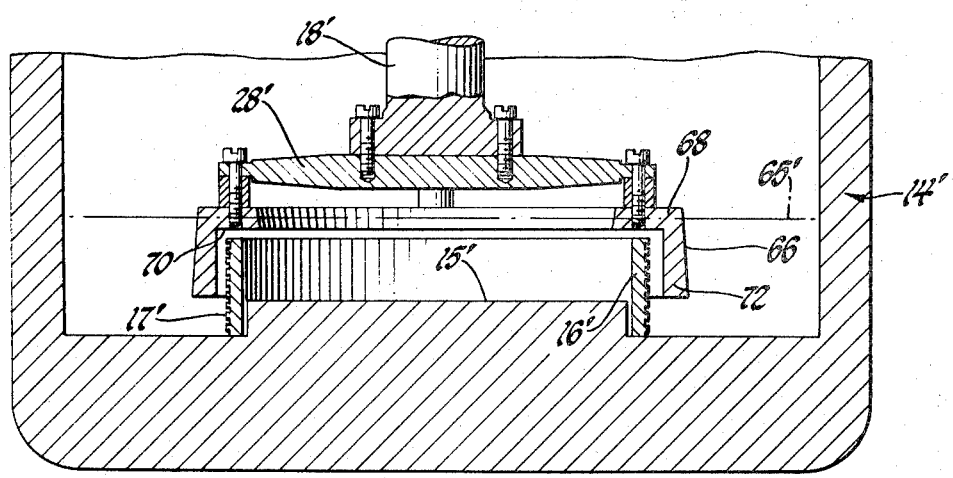
FIGURE 3 shows a modified version of the lower end of the vibratory apparatus illustrated in FIGURE 1.

FIGURE 3 shows a modified form of the coupling member which, in this case, indicated by the numeral 66. The coupling member 66 includes a laterally extending flange 68 having a radiator surface 70 integrally formed with a depending skirt 72 which is adapted to surround the brake liner 16' and act as a reflector in the manner of the baffle 56 incorporated with the apparatus shown in FIGURE 1. Except for this difference, the vibratory apparatus is identical to that previously described and operated in a similar manner for achieving wetting of the brake liner. It will be noted that parts corresponding to those incorporated with the apparatus of FIGURE 1 are identified by corresponding numerals but primed.

In both of the embodiments of the vibratory apparatus it will be noted that the coupling member has a radiator surface which extends laterally beyond the outer diameter of the brake liner. In addition, in both cases some form of baffle or reflecting means is positioned adjacent to the periphery of the brake liner during the wetting operation so that molten aluminum is confined in a small area next to the peripheral surface of the brake liner. Thus, the sonic waves emitted from the radiator surface of the coupling member are concentrated in localized portions of the bath. It is believed that primarily because of this particular type of arrangement optimum wetting can be obtained. Another important feature is the resonant operation of the disk-shaped member 28. As alluded to herebefore, during resonant operation maximum vibration amplitude is realized in the elastic member accompanied by high levels of acceleration.

As stated, the peripheral surface of the ferrous-metal brake liner is provided with a multiplicity of cavities and craters. Many of these cavities are undercut and form the basis for an interlocking mechanical bond as well as a metallurgical bond between the dissimilar metals. A suitable method for forming this type of irregular cylindrical surface can be found in the patent to Myers, 2,623,809. Thorough and uniform wetting of a brake liner of this type cannot be obtained under static immersion conditions due to the surface tension characteristics of the material. However, with our process the irregular surface of the liner can be readily contacted and wetted because the induced cavitation dislodges any foreign material including occluded gases from the interface. As a result the entire peripheral surface is wetted to form an aluminum layer over the peripheral surface 17 bonded thereto by an integral ferro-aluminum interlayer.

The ferrous metal wear-resistant liner may be of cast iron or steel. A 1080 steel has been found to provide excellent braking properties. As stated above, the presence of the cavities and craters in the outer peripheral surface of the liner lead to an improved mechanical as well as metallic bond when the surface is wetted and eventually cast against the aluminum.

In general, depending upon bath conditions and the nature of the surface to be wetted, the liner may be removed from the bath after a residence time of 10 to 30 seconds. It is preferable that the aluminum body portion of the brake drum be cast against the wetted ferrous-metal liner surface immediately after the liner has been removed from the aluminum wetting bath. A better aluminum-to-aluminum bond is obtained if the aluminum on the surface of the steel liner is in a molten state as is the aluminum entering the mold cavity. Furthermore, if the transfer of the liner from the wetting bath to the mold in which the final product is cast is effected in 30 seconds or less, the bond is improved due to the fact that less aluminum oxides are formed.

Figure 4:
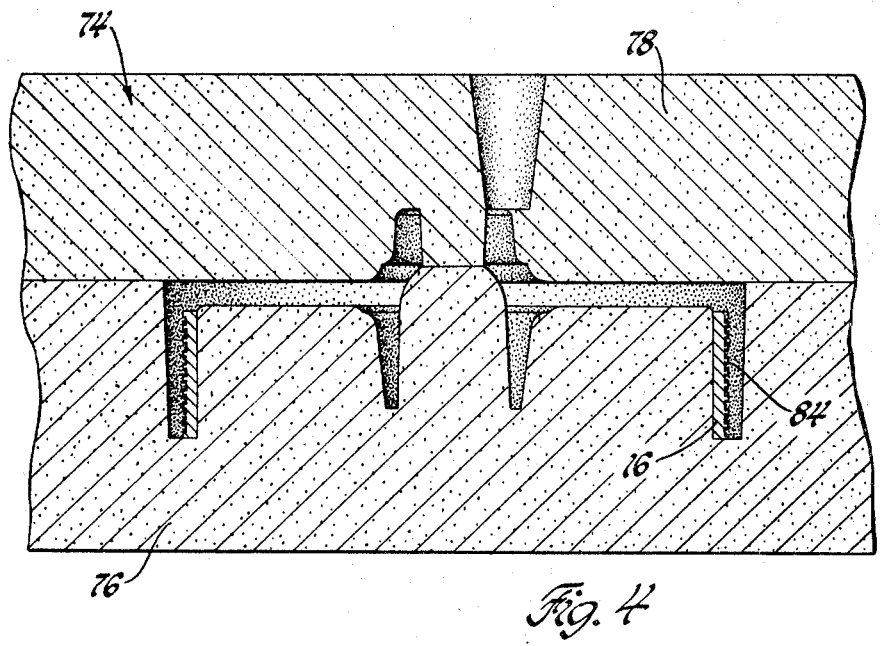
FIGURE 4 shows a suitable mold for casting the completed drum.

FIGURE 4 illustrates a suitable mold 74 into which the hot wetted liner 16 may be inserted. It is inserted into the drag portion 76 and the cope portion 78 is immediately placed into position over the drag 76. As soon as possible, molten aluminum or aluminum alloy is poured into the mold to complete the casting.

Figure 5:
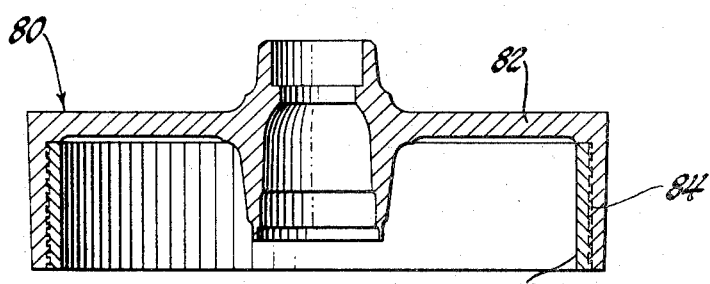
FIGURE 5 is a sectional view of the bimetallic brake drum.

As best shown in FIGURE 5 the completed brake drum 80 has a steel liner portion 16 and an aluminum body portion 82. The interface 84 between the respective sections is irregular resulting from the character of the peripheral surface of the steel liner.

We have found that when good wetting is obtained an iron-aluminum compound is formed at the interface of the two metals. The presence of such a compound can be detected in a photomicrograph of a sample which has been etched with dilute hydrofluoric acid. When the aluminum wetting has been accomplished in accordance with our process the iron-aluminum compound is formed in the bimetallic interface about the whole periphery of the liner and excellent wear properties are realized from the brake drum produced therefrom. Upon removal of cast bimetallic brake drum from its mold, any necessary machining operations may be performed.

Although this invention has been described utilizing aluminum for wetting cast iron and particularly steel brake liners, it is apparent that the same general process may be used for the wetting and casting of other bimetallic articles.

Therefore, while this invention has been described in terms of a certain preferred embodiment, it is to be understood that other applications will be apparent to those skilled in the art and are within the scope of this invention as defined by the following claims.

We claim:

1. An improved method of making a bimetallic article having a higher-melting portion, a lower-melting portion, and at least one interfacial area common to each portion at which said metallic portions are mechanically and metallurgically bonded together at their respective surfaces, said method being comprised of the steps of providing said interfacial area of the higher-melting portion with an irregular surface characterized by a multiplicity of cavities and recesses thus forming the basis for an interlocking mechanical bond; contacting said irregular surface with said lower-melting metal in the molten state; creating an intensive cavitation field in said molten metal in an area adjacent to said contacted surface by means of high frequency sonic vibrations, whereby said molten metal thoroughly wets said irregular surface including said cavities and recesses to form a layer of said lower-melting metal over all of said interfacial area bonded thereto by a integral higher-melting metallic-lower-melting metallic interlayer thus furnishing the basis for a metallurgical bond; and immediately inserting said higher-melting portion into a mold and casting said molten lower-melting metal into said mold and against said wetted surface of said high-melting portion whereby said bimetallic article is formed having both a mechanical and metallurgical bond between the dissimilar metals.

2. A method as in claim 1 wherein said higher-melting portion is of a ferrous-base alloy and said lower-melting portion is of an aluminum-base alloy.

3. A method as in claim 1 wherein said cavitation field is created in said molten metal by producing a high frequency sonic resonant vibration in a flexural member having a radiator surface, and locating said radiator surface in said molten metal in an area adjacent to said contacted irregular surface.

4. A method as in claim 3 wherein said high-melting metallic portion is immersed in a bath of said lower-melting metal and said radiator surface is immersed in said bath whereby a portion of said radiator surface extends laterally beyond the roughened surface of said higher-melting metallic portion.

5. A method as in claim 1 wherein said irregular surface of said higher-melting portion is wetted with said molten lower-melting metal by the steps comprised of immersing said higher-melting portion in a bath of said molten metal, producing a high frequency resonant vibration in a flexural member, coupling said flexural member to a sonic wave radiator surface, and immersing said radiator surface in said bath in a position so that vibratory energy emanating from said radiator surface is concentrated about said roughened surface.

6. A method as in claim 5 wherein the antinodal point of said flexural member is coupled to said sonic wave radiator surface.

7. An improved method of making an aluminum brake drum having a ferrous metal liner comprising the steps of providing a ferrous metal ring-shaped liner having the peripheral surface thereof formed with a multiplicity of cavities and recesses; immersing said liner into a bath of molten aluminum; producing a high frequency resonant vibration in a flexural member having a radiator surface; locating said radiator surface in said bath so as to create an intense cavitation field in an area adjacent to said peripheral surface whereby the aluminum thoroughly wets said peripheral surface including said cavities and recesses to form a molten aluminum layer over said periphery bonded thereto by an integral ferro-aluminum interlayer; removing said liner from said aluminum bath and immediately inserting it into the cavity of a mold, said cavity defining the configuration of said drum; and casting molten aluminum into said mold against said wetted peripheral surface of said ferrous metal liner to form said brake drum having a strong mechanical and metallurgical bond between said aluminum and ferrous metal portions.

8. A process as in claim 7 wherein said ferrous metal liner is left in said cavitation field in said aluminum bath for a period of 10–30 seconds.

9. A method as in claim 7 wherein said ferrous metal liner is formed of 1080 steel.

10. A process as in claim 7 wherein a portion of said radiator surface extends radially beyond the peripheral surface of said liner.

11. The method of claim 7 wherein said radiator surface is positioned in a plane substantially normal to the axis of said liner.

12. The method of claim 7 wherein a baffle is provided for concentrating and reflecting sonic energy emanating from said radiator surface in the area of said peripheral surface.

13. A brake drum produced in accordance with the method of claim 7.

14. A bimetallic article produced in accordance with claim 1.

References Cited

UNITED STATES PATENTS

| | | | |
|---|---|---|---|
| 2,664,874 | 1/1954 | Graham | 29—196.2 X |
| 2,756,488 | 7/1956 | Stevens | 29—196.2 X |
| 2,326,418 | 8/1943 | Van Amerongen et al. | 164—71 |
| 894,163 | 7/1908 | Monnot | 164—96 |
| 2,396,730 | 3/1946 | Whitfield et al. | 164—75 |
| 2,435,991 | 2/1948 | Whitfield | 164—75 |
| 2,453,772 | 11/1948 | Whitfield et al. | 164—75 |
| 2,634,469 | 4/1953 | Pershing et al. | 164—102 |
| 2,881,491 | 4/1959 | Jominy et al. | 164—102 |
| 2,903,763 | 9/1959 | Grenell | 164—111 |
| 3,069,209 | 12/1962 | Bauer | 164—111 |
| 3,098,170 | 7/1963 | Bauer | 164—103 |
| 3,165,983 | 1/1965 | Thomas | 164—95 X |
| 3,216,072 | 11/1965 | Bauer | 164—95 X |

FOREIGN PATENTS

| | | |
|---|---|---|
| 228,952 | 8/1963 | Austria. |
| 1,255,831 | 1/1961 | France. |
| 873,012 | 7/1961 | Great Britain. |
| 760,193 | 6/1953 | Germany. |

J. SPENCER OVERHOLSER, Primary Examiner.

V. K. RISING, Assistant Examiner.